US012474922B2

(12) United States Patent
Togni et al.

(10) Patent No.: US 12,474,922 B2
(45) Date of Patent: Nov. 18, 2025

(54) SYSTEM FOR LEARNING EMBEDDINGS OF CODE EDITS

(71) Applicant: SAP SE, Walldorf (DE)

(72) Inventors: Niccolo Togni, Antibes (FR); Antonino Sabetta, Mouans Sartoux (FR); Rocio Cabrera Lozoya, Antibes (FR)

(73) Assignee: SAP SE, Walldorf (DE)

( * ) Notice: Subject to any disclaimer, the term of this patent is extended or adjusted under 35 U.S.C. 154(b) by 284 days.

(21) Appl. No.: 17/955,786

(22) Filed: Sep. 29, 2022

(65) Prior Publication Data

US 2024/0111522 A1    Apr. 4, 2024

(51) Int. Cl.
*G06F 8/71*    (2018.01)
*G06F 8/41*    (2018.01)

(52) U.S. Cl.
CPC ............... *G06F 8/71* (2013.01); *G06F 8/433* (2013.01)

(58) Field of Classification Search
CPC .................................. G06F 8/71; G06F 8/433
See application file for complete search history.

(56) References Cited

U.S. PATENT DOCUMENTS

| | | | | |
|---|---|---|---|---|
| 2019/0347424 | A1* | 11/2019 | Bezzi | G06F 21/577 |
| 2020/0089491 | A1* | 3/2020 | Sahu | G06F 8/75 |
| 2021/0255853 | A1* | 8/2021 | Zhou | G06F 11/079 |
| 2023/0176838 | A1* | 6/2023 | Bronevetsky | G06F 8/71 |
| | | | | 717/110 |

OTHER PUBLICATIONS

Lozoya et al., "Commit2Vec: Learning Distributed Representations of Code Changes," 2021 [retrieved Nov. 16, 2024], SN Computer Science (2021) 2:150, pp. 1-16, downloaded from <url>:https://doi.org/10.1007/s42979-021-00566-z. (Year: 2021).*

Ben-Nun et al., "Neural Code Comprehension: A Learnable Representation of Code Semantics," 2018 [retrieved Nov. 16, 2024], pp. 1-17, downloaded from <url>:https://arxiv.org/abs/1806.07336. (Year: 2018).*

(Continued)

*Primary Examiner* — S. Sough
*Assistant Examiner* — Stephen D Berman
(74) *Attorney, Agent, or Firm* — SCHWEGMAN LUNDBERG & WOESSNER, P.A.

(57) ABSTRACT

Systems and methods are provided for analyzing a commit comprising an updated version of software code against a previous version of software code to determine a plurality of methods in the commit that have been changed, identifying a previous version and an updated version for each method that has been changed, and generating graphical representations of each previous version and each updated version of each method that has been changed. The systems and methods further provide for extracting path contexts from each graphical representation for each previous version and each updated version of each method, determining path contexts that are different by comparing each path context for each previous version with an associated updated version of each method, and encoding each path context that is different to generate at least one commit vector representation of the commit.

20 Claims, 7 Drawing Sheets

(56) References Cited

OTHER PUBLICATIONS

Bozhi Wu et al., "Enhancing Security Patch Identification by Capturing Structures in Commits," 2015 [retrieved on May 14, 2025], IEEE Transactions on Dependable and Secure Computing, pp. 1-15, downloaded from <url>:https://ieeexplore.ieee.org. (Year: 2015).*
Stanislav Levin et al., "Boosting Automatic Commit Classification Into Maintenance Activities by Utilizing Source Code Changes," 2017 [retrieved May 14, 2025], Promise, pp. 97-106, downloaded from https://dl.acm.org. (Year: 2017).*
Miltiadis Allamanis et al., "Learning to Represent Programs with Graphs," 2018 [retrieved on May 14, 2025], pp. 1-17, downloaded from <url>:https://arxiv.org/abs/1711.00740. (Year: 2018).*
Meng et al., "Classifying Code Commits with Convolutional Neural Networks," 2021 [retrieved on May 14, 2025], pp. 1-8, 2021 International Joint Conference on Neural Networks (IJCNN), downloaded from <url>:https://ieeexplore.ieee.org. (Year: 2021).*
Ain, Qurat UL, et al., "A Systematic Review on Code Clone Detection", IEEE Access, vol. 7, (2019), 86121-86144.
Allamanis, Miltiadis, et al., "Learning to represent programs with graphs", ICLR, [Online]. Retrieved from the Internet: <URL: https://arxiv.org/pdf/1711.00740.pdf>, (May 4, 2018), 17 pgs.
Alon, Uri, et al., "code2seq: Generating sequences from structured representations of code", ICLR, [Online]. Retrieved from the Internet: <URL: https://arxiv.org/pdf/1808.01400.pdf>, (Feb. 21, 2019), 22 pgs.
Alon, Uri, et al., "Code2vec: Learning distributed representations of code", Proc. ACM Program. Lang., vol. 3, No. POPL, Article 40, [Online]. Retrieved from the Internet: <URL: https://dl.acm.org/doi/pdf/10.1145/3290353>, (2019), 29 pgs.
Cummins, Chris, et al., "ProGraML: A Graph-based Program Representation for Data Flow Analysis and Compiler Optimizations", Thirty-eighth International Conference on Machine Learning (ICML), [Online]. Retrieved from the Internet: <URL: http://proceedings.mlr.press/v139/cummins21a/cummins21a.pdf>, (2021), 10 pgs.
Feng, Zhangyin, et al., "CodeBERT: A pre-trained model for programming and natural languages", arXiv:2002.08155v4, [Online]. Retrieved from the Internet: <URL: https://arxiv.org/pdf/2002.08155.pdf>, (2020), 12 pgs.
Guo, Daya, et al., "Graphcodebert: Pre-training code representations with data flow", ICLR. arXiv:2009.08366v4, [Online]. Retrieved from the Internet: <URL: https://arxiv.org/pdf/2009.08366.pdf>, (2021), 18 pgs.
Hellendoorn, Vincent, et al., "Global relational models of source code", ICLR, [Online]. Retrieved from the Internet: <URL: https://openreview.net/pdf?id=B1lnbRNtwr>, (2020), 12 pgs.
Hoang, Thong, et al., "Cc2vec: Distributed representations of code changes", Proceedings of the ACM/IEEE 42nd International Conference on Software Engineering. arXiv:2003.05620, [Online]. Retrieved from the Internet: <URL: https://arxiv.org/abs/2003.05620#:~:text=CC2Vec%20models%20the%20hierarchical%20structure,the%20removed%20and%20added%20code.>, (2020), 12 pgs.
Lachaux, Marie-Anne, et al., "Unsupervised translation of programming languages", arXiv:2006.03511v3, [Online]. Retrieved from the Internet: <URL: https://arxiv.org/pdf/2006.03511.pdf>, (2020), 21 pgs.
Lozoya, Rocio, et al., "Commit2vec: Learning distributed representations of code changes", SN Computer Science, 2(3), [Online]. Retrieved from the Internet: <URL: https://arxiv.org/pdf/1911.07605.pdf>, (Mar. 2021), 15 pgs.
Phan, Anh Viet, et al., "Convolutional Neural Networks over Control Flow Graphs for Software Defect Prediction", arXiv:1802.04986v1, [Online]. Retrieved from the Internet: <URL: https://arxiv.org/pdf/1802.04986.pdf>, (2018), 8 pgs.
Ponta, Serena, et al., "A Manually-Curated Dataset of Fixes to Vulnerabilities of Open-Source Software", Proceeding of the 16th IEEE/ACM International Conference on Mining Software Repositories. arXiv:1902.02595v3, [Online]. Retrieved from the Internet: <URL:, (2019), 6 pgs.
Qureshi, Syed, et al., "Assessing the effectiveness of syntactic structure to learn code edit representations", arXiv:2106.06110v1, [Online]. Retrieved from the Internet: <URL: https://arxiv.org/pdf/2106.06110.pdf>, (2021), 11 pgs.
Swarna, Karthik, et al., "A mocktail of source code representations", IEEE Transactions on Software Engineering. arXiv:2106.10918v2, [Online]. Retrieved from the Internet: <URL: https://arxiv.org/pdf/2106.10918.pdf>, (2022), 12 pgs.
Wei, Ma, et al., "Graphcode2vec: Generic code embedding via lexical and program dependence analyses", Association for Computing Machinery. arXiv:2112.01218v2, [Online]. Retrieved from the Internet: <URL: https://arxiv.org/pdf/2112.01218.pdf>, (2022), 12 pgs.
Yamaguchi, Fabian, et al., "Modeling and Discovering Vulnerabilities with Code Property Graphs", IEEE Symposium on Security and Privacy, [Online]. Retrieved from the Internet: <URL: https://comsecuris.com/papers/06956589.pdf>, (2014), 590-604.
Yin, Pengcheng, et al., "Learning to represent edits", arXiv:1810.13337v2, [Online]. Retrieved from the Internet: <URL: https://arxiv.org/pdf/1810.13337.pdf>, (2019), 22 pgs.
Zugner, Daniel, et al., "Language-agnostic representation learning of source code from structure and context", Published as a conference paper at ICLR. arXiv:2103.11318v1, [Online]. Retrieved from the Internet: <URL: https://arxiv.org/pdf/2103.11318.pdf>, (2021), 22 pgs.

* cited by examiner

SYSTEM FOR LEARNING EMBEDDINGS OF CODE EDITS

BACKGROUND

After revolutionizing many research fields, including computer vision and natural language processing, Deep Neural Networks are at the center of recent breakthroughs in the field of software engineering and especially source code analysis. Most works focus on the analysis of static pieces of code. However, because of the dynamic nature of codebases, many important applications require analyzing code changes (or commits) which entails considering the temporal component. Finding an effective representation of commits for deep learning applications is still an open research question.

BRIEF DESCRIPTION OF THE DRAWINGS

Various ones of the appended drawings merely illustrate example embodiments of the present disclosure and should not be considered as limiting its scope.

DETAILED DESCRIPTION

Systems and methods described herein relate to learning embeddings of code edits. As mentioned above, finding an effective representation of commits for deep learning applications is still an open research question. A "commit" is a change in software source code, such as a revision to a portion of the code or addition of new code. Learning distributed representations of source code is the central problem of many deep learning-based approaches to solve software engineering tasks such as code clone detection, code summarization or vulnerability identification. There is a rapidly growing number of research papers that address this problem, however, there is only a modest amount of literature that focus on learning a representation of commits. Only in rare occasions, however, does the source code of a program remain static and unchanged for long periods of time because the process of software development is essentially incremental, with most programs and libraries being continually updated. Consequently, program analysis tasks often require scanning several versions of the source code to identify when and where a particular change was introduced, and the impact it has on the program itself.

Embodiments described herein comprise a new path-based model for distributed representation of code edits that combines multiple representations of the code associated to different graph structures. Specifically, since software code is written following precise formal rules, it is possible to represent software code using abstract graph structures that encode syntactic and/or semantic information. Different types of paths can be extracted from graph structures such as an abstract syntax tree (AST), a Control Flow Graph (CFG), a Data Flow Graph (DFG), or other graph structure. Example embodiments define a new method for extracting meaningful paths from one or more of these graph structures that comprises splitting the graph into its basic blocks. This representation, derived from multiple code graphs, can encode changes in the syntactic structure of the code, in the data flow and in the control flow, as examples.

The commit representation method described herein can be used as a fundamental building block enabling deep learning applications for code analysis tasks such as the classification of code changes, identification of code patterns, discover of vulnerable code, localization of fixes, identification of security-relevant commits, among other use cases. This method is language-agnostic and thus, can be applied to any programming language and leads to better computational efficiency and reduced redundancy when considering changes in a control flow of code edits. By considering multiple paths from different graphs, the method described herein can discriminate commits based on changes in the code syntax, control flow, and/or data flow. The attention mechanism allows the method to focus on the changes that are more relevant for a downstream task.

Specifically, example embodiments provide systems and methods for analyzing a commit comprising an updated version of software code against a previous version of software code to determine a plurality of methods in the commit that have been changed, identifying a previous version and an updated version for each method that has been changed, and generating graphical representations of each previous version and each updated version of each method that has been changed. The systems and methods further provide for extracting path contexts from each graphical representation for each previous version and each updated version of each method, determining path contexts that are different by comparing each path context for each previous version with an associated updated version of each method, and encoding each path context that is different to generate at least one commit vector representation of the commit.

Figure 1:
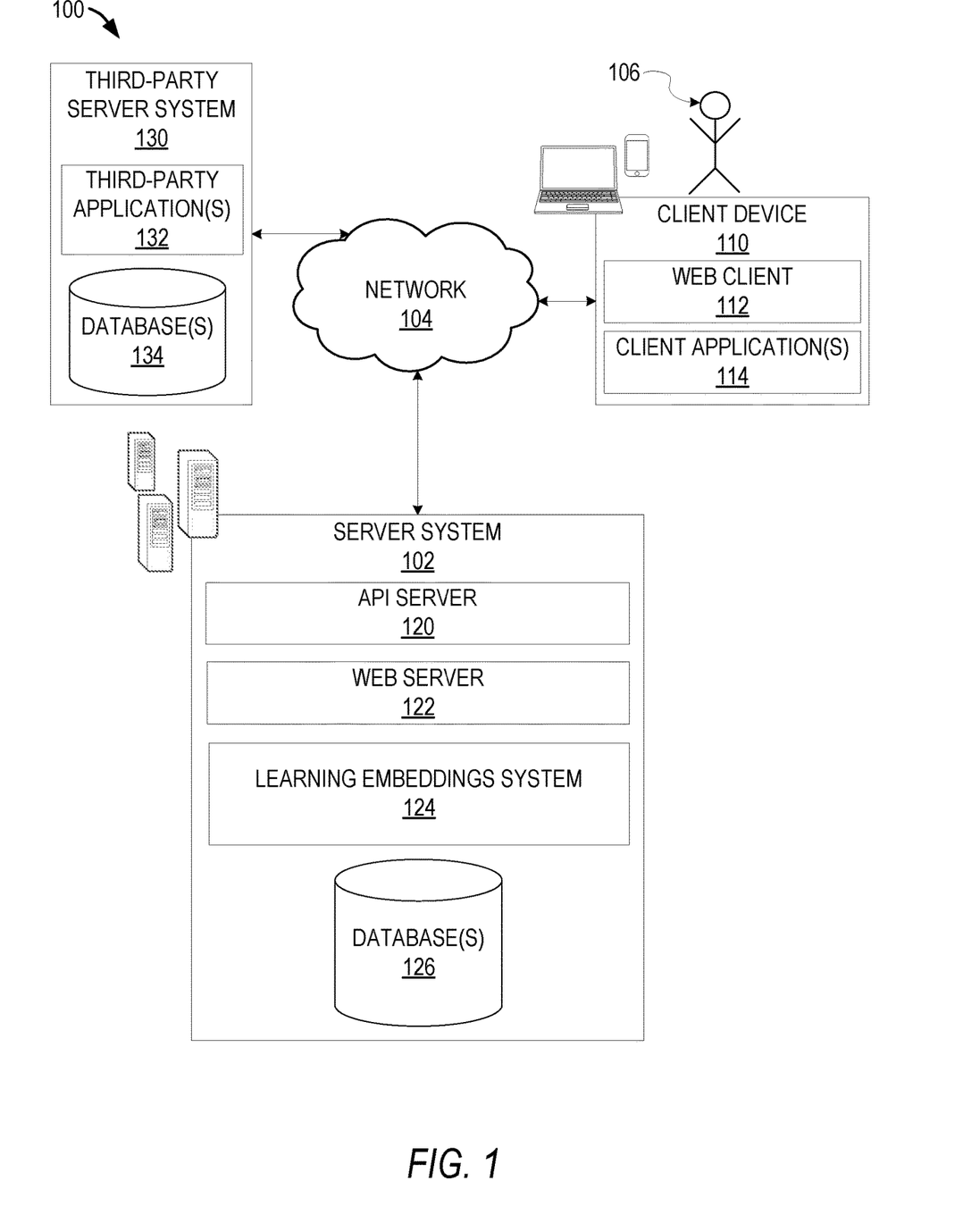
FIG. 1 is a block diagram illustrating a networked system, according to some example embodiments.

FIG. 1 is a block diagram illustrating a networked system 100, according to some example embodiments. The system 100 may include one or more client devices such as client device 110. The client device 110 may comprise, but is not limited to, a mobile phone, desktop computer, laptop, portable digital assistants (PDA), smart phone, tablet, ultra-book, netbook, laptop, multi-processor system, microprocessor-based or programmable consumer electronic, game console, set-top box, computer in a vehicle, wearable computing device, or any other computing or communication device that a user may utilize to access the networked system 100. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, global positioning system (GPS) devices, and so forth. The client device 110 may be a device of a user 106 that is used to access and utilize cloud services, push a commit to update code in a project, utilize a commit learning embeddings system 124, among other applications.

One or more users 106 may be a person, a machine, or other means of interacting with the client device 110. In example embodiments, the user 106 may not be part of the system 100 but may interact with the system 100 via the client device 110 or other means. For instance, the user 106 may provide input (e.g., touch screen input or alphanumeric input) to the client device 110 and the input may be communicated to other entities in the system 100 (e.g., third-party server system 130, server system 102) via the network 104. In this instance, the other entities in the system 100, in response to receiving the input from the user 106, may communicate information to the client device 110 via the network 104 to be presented to the user 106. In this way, the user 106 may interact with the various entities in the system 100 using the client device 110.

The system 100 may further include a network 104. One or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

The client device 110 may access the various data and applications provided by other entities in the system 100 via web client 112 (e.g., a browser, such as the Internet Explorer® browser developed by Microsoft® Corporation of Redmond, Washington State) or one or more client applications 114. The client device 110 may include one or more client applications 114 (also referred to as "apps") such as, but not limited to, a web browser, a search engine, a messaging application, an electronic mail (email) application, an e-commerce site application, a mapping or location application, an enterprise resource planning (ERP) application, a customer relationship management (CRM) application, an application for pushing a commit to update code in a project, an application for accessing and utilizing a learning embeddings system 124, and the like.

In some embodiments, one or more client applications 114 may be included in a given client device 110, and configured to locally provide the user interface and at least some of the functionalities, with the client application(s) 114 configured to communicate with other entities in the system 100 (e.g., third-party server system 130, server system 102, etc.), on an as-needed basis, for data and/or processing capabilities not locally available (e.g., access location information, access machine learning models, to authenticate a user 106, to verify a method of payment, access a learning embeddings system 124, and so forth), and so forth. Conversely, one or more client applications 114 may not be included in the client device 110, and then the client device 110 may use its web browser to access the one or more applications hosted on other entities in the system 100 (e.g., third-party server system 130, server system 102).

A server system 102 may provide server-side functionality via the network 104 (e.g., the Internet or wide area network (WAN)) to one or more third-party server system 130 and/or one or more client devices 110. The server system 102 may include an application program interface (API) server 120, a web server 122, and a learning embeddings system 124 that may be communicatively coupled with one or more databases 126.

The one or more databases 126 may be storage devices that store data related to users of the system 100, applications associated with the system 100, cloud services, machine learning models, parameters, and so forth. The one or more databases 126 may further store information related to third-party server system 130, third-party applications 132, third-party database(s) 134, client devices 110, client applications 114, users 106, and so forth. In one example, the one or more databases 126 is cloud-based storage.

The server system 102 may be a cloud computing environment, according to some example embodiments. The server system 102, and any servers associated with the server system 102, may be associated with a cloud-based application, in one example embodiment.

The learning embeddings system 124 may provide back-end support for third-party applications 132 and client applications 114, which may include cloud-based applications. The learning embeddings system 124 may provide for generating a commit vector representation of a commit, as explained in further detail below. The learning embeddings system 124 may comprise one or more servers or other computing devices or systems.

The system 100 further includes one or more third-party server system 130. The one or more third-party server system 130 may include one or more third-party application(s). The one or more third-party application(s) 132, executing on third-party server(s) 130, may interact with the server system 102 via API server 120 via a programmatic interface provided by the API server 120. For example, one or more of the third-party applications 132 may request and utilize information from the server system 102 via the API server 120 to support one or more features or functions on a website hosted by the third party or an application hosted by the third party.

The third-party website or application 132, for example, may provide access to functionality and data supported by third-party server system 130. In one example embodiment, the third-party website or application 132 may provide access to functionality that is supported by relevant functionality and data in the third-party server system 130. In another example, a third-party server system 130 is a system associated with an entity that accesses cloud services via server system 102.

The third-party database(s) 134 may be storage devices that store data related to users of the third-party server system 130, applications associated with the third-party server system 130, cloud services, machine learning models, parameters, and so forth. The one or more databases 126 may further store information related to third-party applications 132, client devices 110, client applications 114, users 106, and so forth. In one example, the one or more databases 134 is cloud-based storage.

Figure 2:
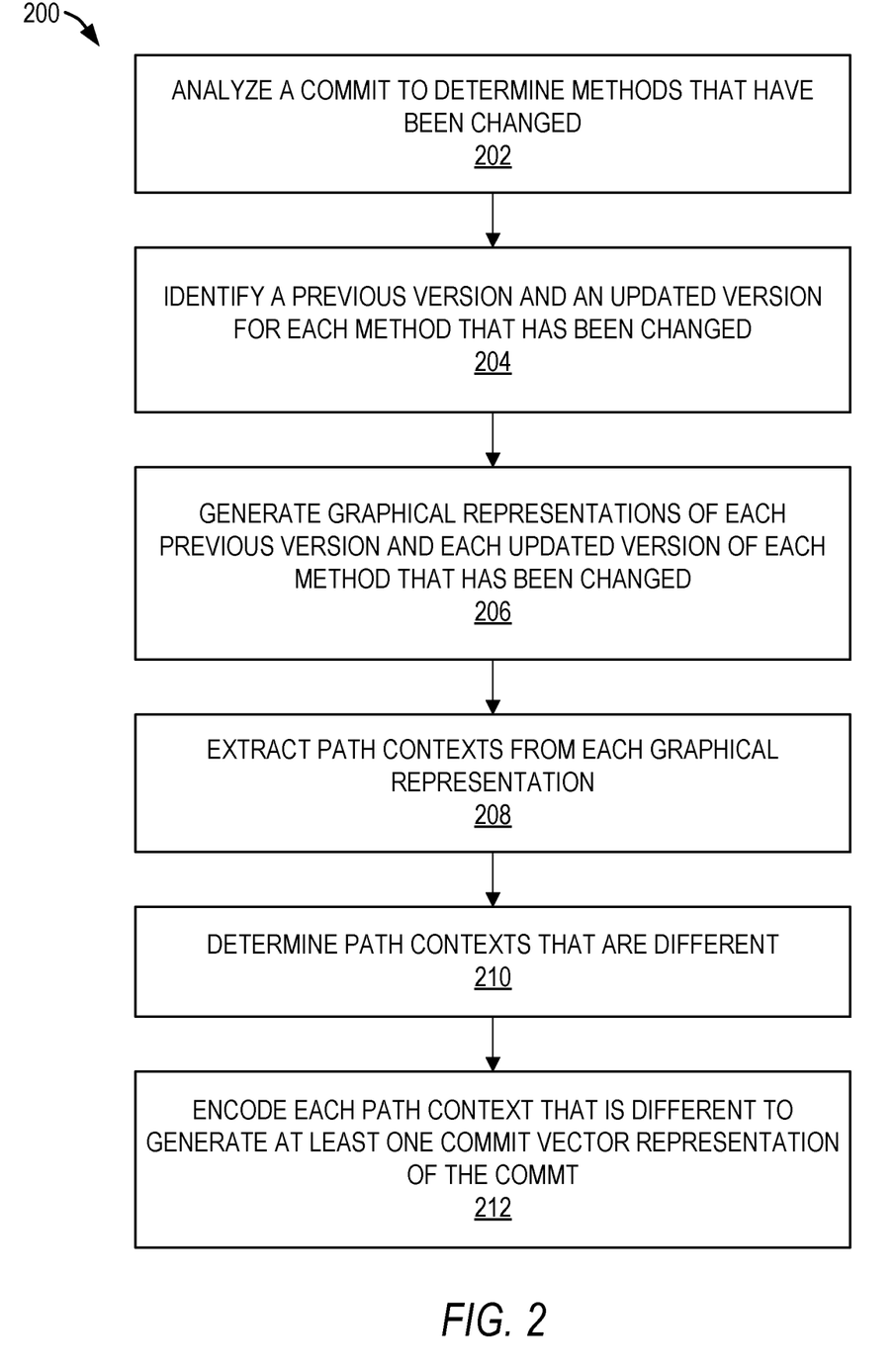
FIG. 2 comprises a flow chart illustrating aspects of a method, according to some example embodiments

FIG. 2 is a flow chart illustrating aspects of a method 200 for a learning embeddings system 124, according to some example embodiments. For illustrative purposes, method 200 is described with respect to the block diagram of FIG. 3. It is to be understood that method 200 may be practiced with other system configurations in other embodiments.

In operation 202, a computing system (e.g., server system 102 or learning embeddings system 124) analyzes a commit to determine methods that have been changed. For example, the computing system can receive a commit from a client device 110 or access one or more databases 126 or 134 or other data store to retrieve the commit. The commit comprises an updated version of software code that is to be used to update existing software code. For example, a commit records a change in one or multiple files of the source code.

The computing system also accesses a previous version of the software code in one or more databases 126 or 134 or other data store. The previous version is typically the current version of the software code before the commit is used to update the software code.

The computing system analyzes the commit comprising the updated version of software code against the previous version of software code to determine a plurality of methods in the commit that have been changed. For example, the computing system can parse the commit and the previous version of software and determine methods with common names between the commit and previous version of software to determine the plurality of methods common between the commit and previous version of software. The computing system can then determine which of the common methods have been changed in the commit.

In the case of a newly added method in the commit (e.g., where there is no previous version), the computing system can determine that the entire new method constitutes the change in the commit. In one example, the contexts of the previous version can be set to NULL (an empty set) and the contexts of the updated version (the new method) can be computed and thus, the symmetric different between them will be all the contexts of the updated version. A similar approach can be used for removed methods.

In the case of methods that have names changed from the previous version of the method, these methods can be identified based on their content. For example, this can be done using an approximated method that uses state of the art code clone detection techniques, such as the one described in "A Systematic Review on Code Clone Detection" published in IEEE by Qurat UI Ain et al. It is to be understood that other methods can be used to identified methods that have names changed in example embodiments.

Figure 3:
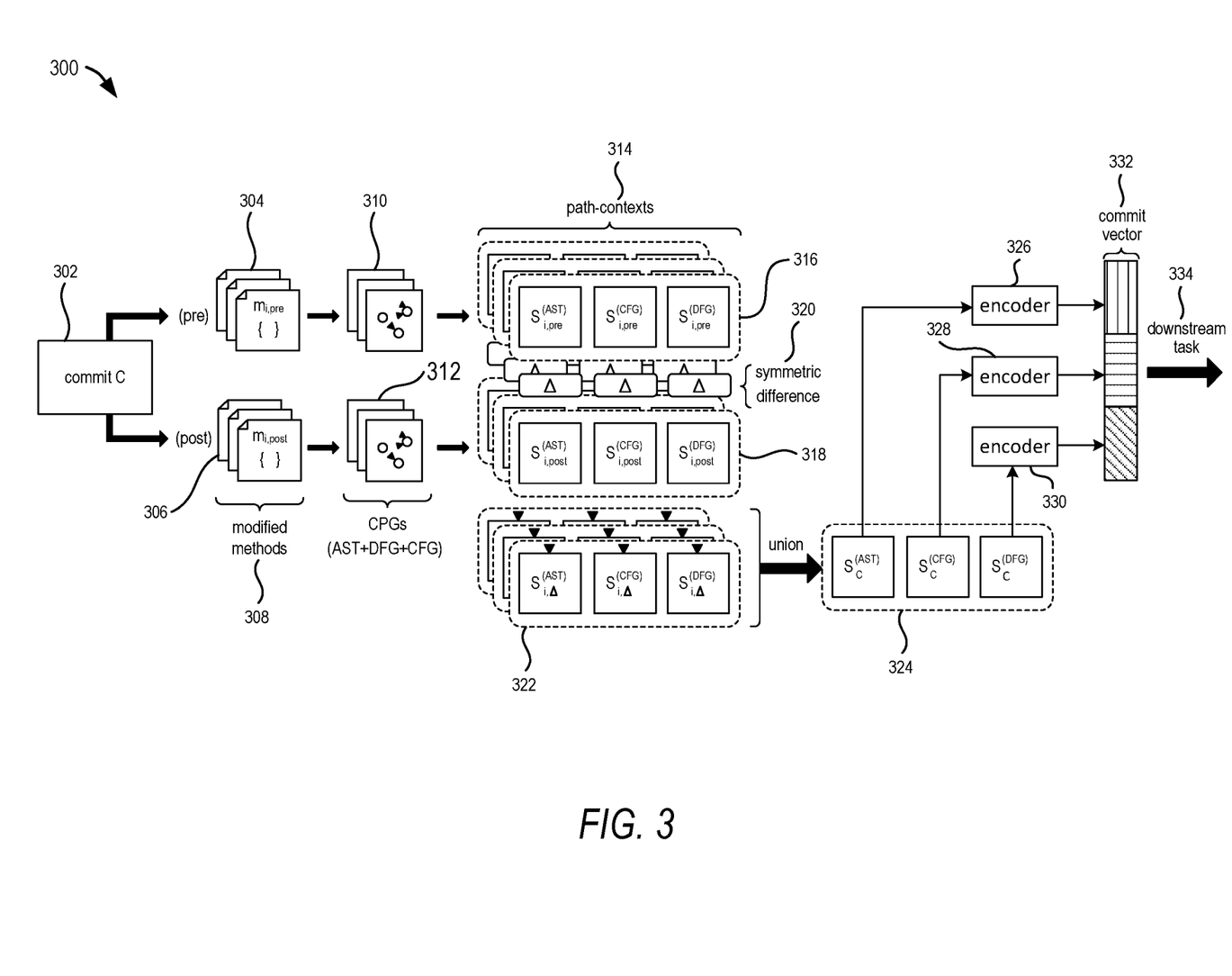
FIG. 3 shows a diagram with an example of the process of FIG. 2, according to some example embodiments.

In operation 204, the computing system identifies a previous version and an updated version for each method of the plurality of methods that have been changed. For example, the computing system identifies the set of changed methods or functions $m_i$ for $i \in \{1, \ldots, 1\}$, where/is the number of modified methods. FIG. 3 shows a diagram 300 with an example of the method 200. In FIG. 3, from commit C 302, $m_{i,pre}$ 304 and $m_{i,post}$ 306 are denoted as the previous version (pre) and the updated version (post), respectively, of each changed method 308.

Returning to FIG. 2, in operation 206, the computing system generates graphical representations of each previous version and each updated version of each method of the plurality of methods in the commit that have been changed. In one example, the computing system generates a code property graph (CPG) of the previous version and updated version of each changed method. The CPG is an integrated data structure containing nodes and edges (e.g., links or connections between nodes) of graphical representations such as an abstract syntax tree (AST), a data flow graph (DFG) or a control flow graph (CFG). In one example, the graphical representations comprise at least two of an abstract syntax tree (AST), a data flow graph (DFG) or a control flow graph (CFG). In another example, the graphical representations comprise the AST, DFG, and CFG. It is to be understood that these are example graphical representations and that other types of graphical representations can also be used in example embodiments. Moreover, it is to be understood that any number or combination of graphical representations can be used. In FIG. 3, the CPGs 310 for the previous version (pre) and the CPGs 312 for the updated version (post) are shown with each CPG comprising nodes and edges of an AST, a DFG and a CFG for the example in FIG. 3.

Figure 4:
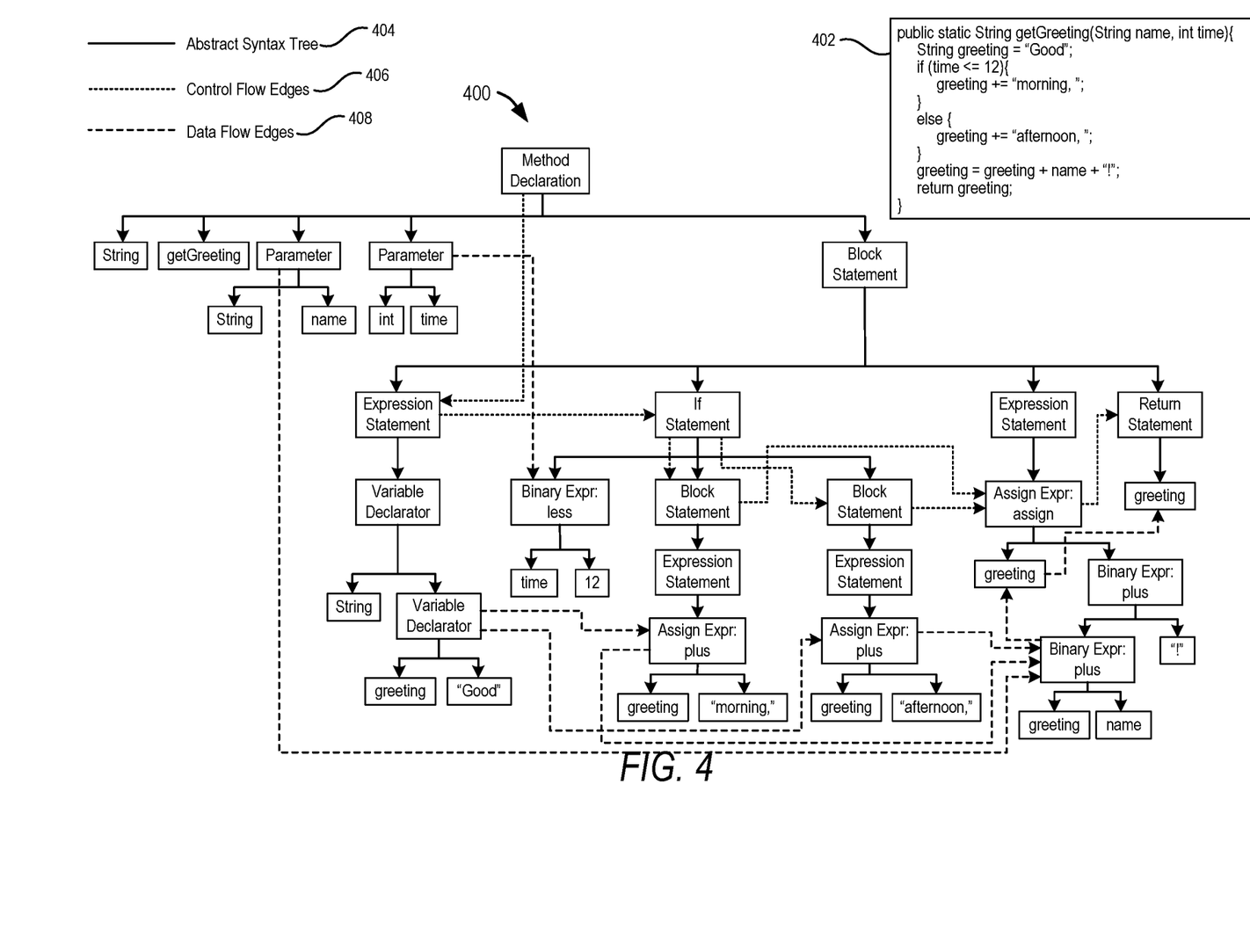
FIG. 4. is a diagram illustrating an example CPG that comprises nodes and edges of graphical representations AST, DFG and CFG, according to some example embodiments.

FIG. 4 is a diagram illustrating an example CPG 400 that comprises nodes and edges of graphical representations for an AST, a DFG and a CFG. Each graphical representation provides additional details to enrich information about the syntax, data flow and control flow. The example CPG 400 is generated from simple example method 402 and includes syntax of the method 402 in the edges from the AST 404, control flow of the method 402 in the edges from the CFG 406, and data flow of the method 402 in the edges from the DFG 408. In one example, the computing system generates the AST and then adds additional edges from the DFG and/or CFG to generate the CPG. The AST comprises a syntax tree and the additional edges from the DFG and CFG capture the dependencies between data items in the syntax tree and also the control flow.

Returning to FIG. 2, in operation 208, the computing system extracts path contexts from each graphical representation for each previous version and each updated version of each method of the plurality of methods. For example, each of the graphical representation or the CPG contains a plurality of nodes. The computing system determines a path between each pair of nodes to constitute a path context. This is done for each previous version and each updated version of each method.

In one example, for each generated CPG, the computing system extracts one group of path contexts for each graphical representation. For example, the computing system extracts a group of path contexts from the AST, a group of path contexts from the DFG and a group of path contexts from the CFG. In an alternate example, the computing system extracts all path contexts from all representations (e.g., AST, DFG, CFG) into a single group of path contexts.

In operation 210, the computing system determines path contexts that are different by comparing each path context for each previous version with an associated updated version of each changed method. In one example the computing system discards each path between each pair of nodes for each previous version and associated updated version that are common and keeps each path between each pair of nodes for each previous version and associated updated version that are different.

The example diagram 300 in FIG. 3 illustrates the path contexts 314 extracted from the CPGs 310 and CPGs 312. In this example, path contexts from the CPGs 310 from the previous versions 304 are shown as path contexts 316, and path contexts from the CPGs 312 from the updated versions 306 are shown as path contexts 318. Specifically, the sets of path contexts associated with the previous version of the method $m_{i,pre}$ is indicated as path contexts 316: $S_{i,pre}^{(AST)}$, $S_{i,pre}^{(CFG)}$ and $S_{i,pre}^{(DFG)}$ and the sets of path contexts associated with the updated version $m_{i,post}$ as path contexts 318: $S_{i,post}^{(AST)}, S_{i,post}^{(CFG)}, S_{i,post}^{(DFG)}$. In the example in FIG. 3, the computing system takes the symmetric difference for each group of path contexts: $S_{i,\Delta}^{(*)} = S_{i,pre}^{(*)} \Delta S_{i,post}^{(*)}$ for $* \in \{AST, CFG, DFG\}$.

In the example in FIG. 3, a symmetric difference 320 is determined to generate the set of path contexts 322 that are different. The path contexts that are common (e.g., not different or changed) can be ignored or discarded. It is to be understood that other methods of determining whether path contexts are different can be used in embodiments described herein.

Also shown in the example in FIG. 3 is a separate set (or group) of path contexts per graphical representation. For example, a set of path contexts are shown for each of the AST previous version (pre), CFG previous version (pre), DFG previous version (pre), AST updated version (post), CFG updated version (post), and DFG updated version (post). Grouping the path contexts into separate sets by graphical representation (e.g., AST, CFG, DFG) is optional and can optimize the system because the number of paths is smaller with fewer combinations and thus improves speed and reduces resources needed by the computing system. In another example, all path contexts in the CPG (or across all graphical representations) can be considered as one set of path contexts.

As also shown in FIG. 3, the path contexts that are different are then all grouped into one set 324 per graphical representation. For instance, all path contexts that are different corresponding to AST are grouped together, all path contexts that are different corresponding to CFG are grouped together and all path contexts that are different corresponding to DFG are grouped together. Thus, for each different path type, the union of all the path context differences are considered for each method: $S_c^{(*)} = U_{i=1,\ldots,r} S_{i,A}^{(*)}$ for $* \in \{AST, CFG, DFG\}$.

The commit is represented by the three sets of path contexts $S_c^{(AST)}$, $S_c^{(AST)}$, and $S_c^{(DFG)}$. In another example, all path contexts can be grouped together in one set, regardless of whether they correspond to AST, CFG, or DFG graphical representations.

In operation 212, the computing system encodes each path context that is different to generate at least one commit vector representation of the commit. For example, the computing system can use an encoder, such as a code2seq or other encoder, to generate a numerical representation of each difference in a single commit vector representation of the commit. In another example, the computing system can use the encoder to generate a numerical representation for each difference in a separate commit vector representation for each graphical representation. For example, the encoder is applied to each of the three sets of paths of contexts and three vectors are obtained that encode information about what changed in the code syntax, in the data flow, and in the control flow. The final vectorial representation of the commit is obtained by concatenating the three vectors. FIG. 3 shows the example where the grouped path contexts 324 are each fed into a separate encoder 326, 328 and 330 to generate a commit vector for each graphical representation that are concatenated into a final commit vector 332.

The commit vector 332 can then be used in numerous downstream tasks such as for training data for a machine learning model or as input to a trained machine learning model. For example, the commit vector 332 can be used as input to a machine learning model trained to identify whether a commit contains security-sensitive changes, group commits by types, identify whether a commit contains code optimizations, and so forth.

For example, the computing system can analyze the commit vector 332 (or multiple commit vectors 332) using a trained machine learning model to indicate whether the commit contains security-sensitive changes. For instance, a user may be a head of a development team of a product in a big software company that handles sensitive information. One product of the software company uses an open source component which has recently been updated. The head of development wishes to ensure that the changes made are not security relevant. For example, the update might only include new features or small cosmetic updates. Whether the changes made are security relevant will help the software company decide if they need to migrate to the newer version as soon as possible or if it can wait until the next scrum sprint. To determine this, the user marks the open source component that needs to be analyzed. The code changes (commits) made in order to achieve the new version are identified as explained above. Each of these commits is then fed to the framework described herein. As described earlier, this will generate the CPG for the modified methods, extract the path contexts from the graph, compute the symmetric difference and input the final commit vector into a trained machine learning model to identify whether the commit(s) contain security-sensitive changes or a trained machine learning model trained to classify commits (e.g., as security related, optimization, minor fix). After analyzing all the commits, the machine learning model flags two changes as security sensitive, for example. One change resolves an SQL injection vulnerability in the previous version of the code. The head of the development team takes note of this and therefore decides to pause all other development tasks and focus all the efforts in migrating into the new version of the open source component. This will ensure that the software company's product is running on the latest and safest versions available.

Figure 5:
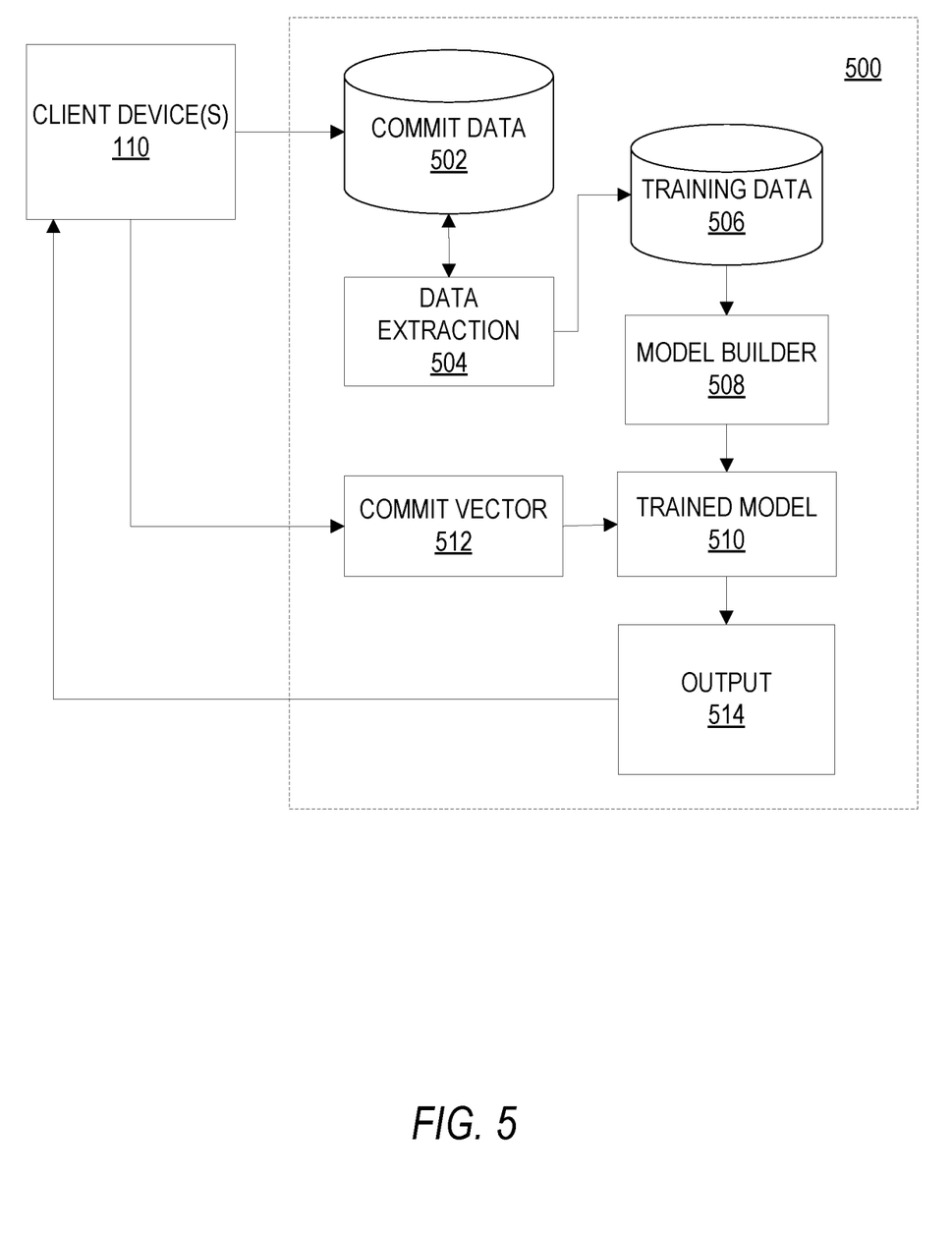
FIG. 5 is a block diagram illustrating a machine learning modeling system, according to some example embodiments.

FIG. 5 is a block diagram illustrating a machine learning modeling system 500 that may be part of the learning embeddings system 124 or server system 102 or a third-party server system 130. Client devices 110 interact with the server system 102, thereby generating data related to the interactions with the system. For example, a client device 110 may be used to submit a commit to be accepted in a project repository for an open source project. The commit includes code changes, among other data related to the commit. The submitted or uploaded commits and associated data are stored in one or more databases, shown as commit data 502. In other examples, this data may be stored in multiple databases, or in databases internal to the server system 102, external to the learning embeddings system 124, or a combination of both. The commit data 502 may thus be received from client devices 110, from other datastores within the server system 102 or learning embeddings system 124, and/or from third-party sources such as the third-party server system 130. The commit data 502 can comprise a very large corpus of commits.

A data extraction component 504 extracts data from the commit data 502, performs the operations of FIG. 2, as explained above to generate commit vector representations of the commits, and stores the commit vectors as training data 506. It is to be understood that other or additional data can also be extracted and stored as training data 506.

The model builder 508 uses the training data 506 to train the trained model 510 to classify a commit, such as containing a security sensitive change, optimization changes, minor fixes, or other classifications. In one example, the model builder 508 loads a deep neural network model such as a fully connected neural network or the like. It is to be understood that other machine learning models can be used in example embodiments, such as random forests, SVMs, boosting machines, and so forth.

The trained model 510 is used to generate one or more classifications for a given commit received from a client device 110. A commit vector 512 representation of the commit is input into the trained model 510. The classification(s) is output by the trained model 510 as output 514.

The output generated by the trained model 510 can be returned to the client device 110 or other requesting computing device or system. The trained machine learning model can be periodically retrained on new or updated data, as needed, using the same techniques as describe above.

As explained above, one example graphical representation is a CFG. In one example, processing the CFG can be optionally optimized to reduce the number of nodes that needs to be considered when extracting path contexts. Reducing the number of nodes results in fewer paths and thus path contexts, which makes for a more efficient process. Essentially, the computing system can collapse nodes in a sequence of statements with no conditional statements in between to create a super node to represent all of the original nodes. This will simplify the CFG path for processing.

For example, CFGs have only one source node, which is the method declaration, and multiple terminal nodes, which indicate the end of the function or a return statement. A complete control flow is a simple path connecting the source to a terminal CFG node.

The number of possible control flows during a program execution is exponential with respect to the number of control structures (i.e., if, for or while statements) since any of these introduces a bifurcation in the CFG. The specific issue addressed in this optimization process is how to represent commits. We do not consider the path contexts extracted from methods themselves, but the difference of path contexts between the previous (prior) and the updated (posterior) version of a method.

The problem with complete control flows is that many parts or "blocks" of the control flow are included in all the CFG paths. If a change is made involving one of these blocks it can potentially modify all the CFG paths of the method. In this scenario the set $S_{i,\Delta}^{(CFG)}$ will contain all the control flows from $S_{i,pre}^{(CFG)}$ and $S_{i,post}^{(CFG)}$ since $S_{i,pre}^{(CFG)} \cap S_{i,post}^{(CFG)} = \emptyset$. Consequently, extracting the complete control flow can be impractical and also lead to redundancy and noise in the data. To tackle this issue, the control flows are split into its basic blocks. We define a Control Flow Basic Block (CFBB) as a sequence of nodes connected by a CFG edge. Segments terminate when one of these conditions is met:

A terminal node is reached (return).

A bifurcation is encountered. Then, the next nodes in the bifurcation become the starting point of new separate segments.

A node with more than one incoming CFG edge is reached. Then, the following node(s) become the starting point(s) of a segment.

Basic blocks are the fundamental units that can form every possible complete control flow from the method definition to the return statement(s). Crucially, the number of control flow basis blocks is linear with respect to the number of control structures. Moreover, the control flow basic blocks reduces redundancy and allows the system to focus only the parts in the control flow that were actually modified in the commit.

In view of the above disclosure, various examples are set forth below. It should be noted that one or more features of an example, taken in isolation or combination, should be considered within the disclosure of this application.

Example 1. A computer-implemented method comprising:
analyzing a commit comprising an updated version of software code against a previous version of software code to determine a plurality of methods in the commit that have been changed;
identifying a previous version and an updated version for each method of the plurality of methods that have been changed;
generating graphical representations of each previous version and each updated version of each method of the plurality of methods in the commit that have been changed;
extracting path contexts from each graphical representation for each previous version and each updated version of each method of the plurality of methods;
determining path contexts that are different by comparing each path context for each previous version with an associated updated version of each method of the plurality of methods; and encoding each path context that is different to generate at least one commit vector representation of the commit.

Example 2. A computer-implemented method according to any of the previous examples, further comprising:
analyzing the at least one commit vector representation by a machine learning model trained to indicate whether the commit contains security-sensitive changes.

Example 3. A computer-implemented method according to any of the previous examples, wherein analyzing the commit comprising the updated version of software code against the previous version of software code comprises:
parsing the commit and the previous version of software code to determine the plurality of methods.

Example 4. A computer-implemented method according to any of the previous examples, wherein the graphical representations comprise at least two of an abstract syntax tree (AST), a data flow graph (DFG) or a control flow graph (CFG).

Example 5. A computer-implemented method according to any of the previous examples, wherein encoding each path context that is different to generate at least one commit vector representation of the commit comprises generating a commit vector representation for the AST and the DFG or CFG.

Example 6. A computer-implemented method according to any of the previous examples, wherein each of the graphical representations comprise a plurality of nodes and extracting path contexts from each graphical representation for each previous version and each updated version of each method of the plurality of methods comprises determining a path between each pair of nodes as each at least one path context.

Example 7. A computer-implemented method according to any of the previous examples, wherein determining path contexts that are different by comparing each path context for each previous version with an associated updated version of each method of the plurality of methods comprises:
discarding each path between each pair of nodes for each previous version and associated updated version that are common; and
keeping each path between each pair of nodes for each previous version and associated updated version that are different.

Example 8. A computer-implemented method according to any of the previous examples, wherein generating the at least one commit vector representation of the commit comprises using an encoder to generate a numerical representation of each difference in a single commit vector representation of the commit.

Example 9. A computer-implemented method according to any of the previous examples, wherein generating the at least one commit vector representation of the commit comprises using an encoder to generate a numerical representation of each difference in a commit vector representation for each graphical representation.

Example 10. A system comprising:
a memory that stores instructions; and
one or more processors configured by the instructions to perform operations comprising:
  analyzing a commit comprising an updated version of software code against a previous version of software code to determine a plurality of methods in the commit that have been changed;
  identifying a previous version and an updated version for each method of the plurality of methods that have been changed;
  generating graphical representations of each previous version and each updated version of each method of the plurality of methods in the commit that have been changed;
  extracting path contexts from each graphical representation for each previous version and each updated version of each method of the plurality of methods;
  determining path contexts that are different by comparing each path context for each previous version with an associated updated version of each method of the plurality of methods; and
  encoding each path context that is different to generate at least one commit vector representation of the commit.

Example 11. A system according to any of the previous examples, the operations further comprising:
  analyzing the at least one commit vector representation by a machine learning model trained to indicate whether the commit contains security-sensitive changes.

Example 12. A system according to any of the previous examples, wherein analyzing the commit comprising the updated version of software code against the previous version of software code comprises:
  parsing the commit and the previous version of software code to determine the plurality of methods.

Example 13. A system according to any of the previous examples, wherein the graphical representations comprise at least two of an abstract syntax tree (AST), a data flow graph (DFG) or a control flow graph (CFG).

Example 14. A system according to any of the previous examples, wherein encoding each path context that is different to generate at least one commit vector representation of the commit comprises generating a commit vector representation for the AST and the DFG or CFG.

Example 15. A system according to any of the previous examples, wherein each of the graphical representations comprise a plurality of nodes and extracting path contexts from each graphical representation for each previous version and each updated version of each method of the plurality of methods comprises determining a path between each pair of nodes as each at least one path context.

Example 16. A system according to any of the previous examples, wherein determining path contexts that are different by comparing each path context for each previous version with an associated updated version of each method of the plurality of methods comprises:
  discarding each path between each pair of nodes for each previous version and associated updated version that are common; and
  keeping each path between each pair of nodes for each previous version and associated updated version that are different.

Example 17. A system according to any of the previous examples, wherein generating the at least one commit vector representation of the commit comprises using an encoder to generate a numerical representation of each difference in a single commit vector representation of the commit.

Example 18. A system according to any of the previous examples, wherein generating the at least one commit vector representation of the commit comprises using an encoder to generate a numerical representation of each difference in a commit vector representation for each graphical representation.

Example 19. A non-transitory computer-readable medium comprising instructions stored thereon that are executable by at least one processor to cause a computing device to perform operations comprising:
  analyzing a commit comprising an updated version of software code against a previous version of software code to determine a plurality of methods in the commit that have been changed;
  identifying a previous version and an updated version for each method of the plurality of methods that have been changed;
  generating graphical representations of each previous version and each updated version of each method of the plurality of methods in the commit that have been changed;
  extracting path contexts from each graphical representation for each previous version and each updated version of each method of the plurality of methods;
  determining path contexts that are different by comparing each path context for each previous version with an associated updated version of each method of the plurality of methods; and
  encoding each path context that is different to generate at least one commit vector representation of the commit.

Example 20. A non-transitory computer-readable medium according to any of the previous examples, the operations further comprising:
  analyzing the at least one commit vector representation by a machine learning model trained to indicate whether the commit contains security-sensitive changes.

Figure 6:
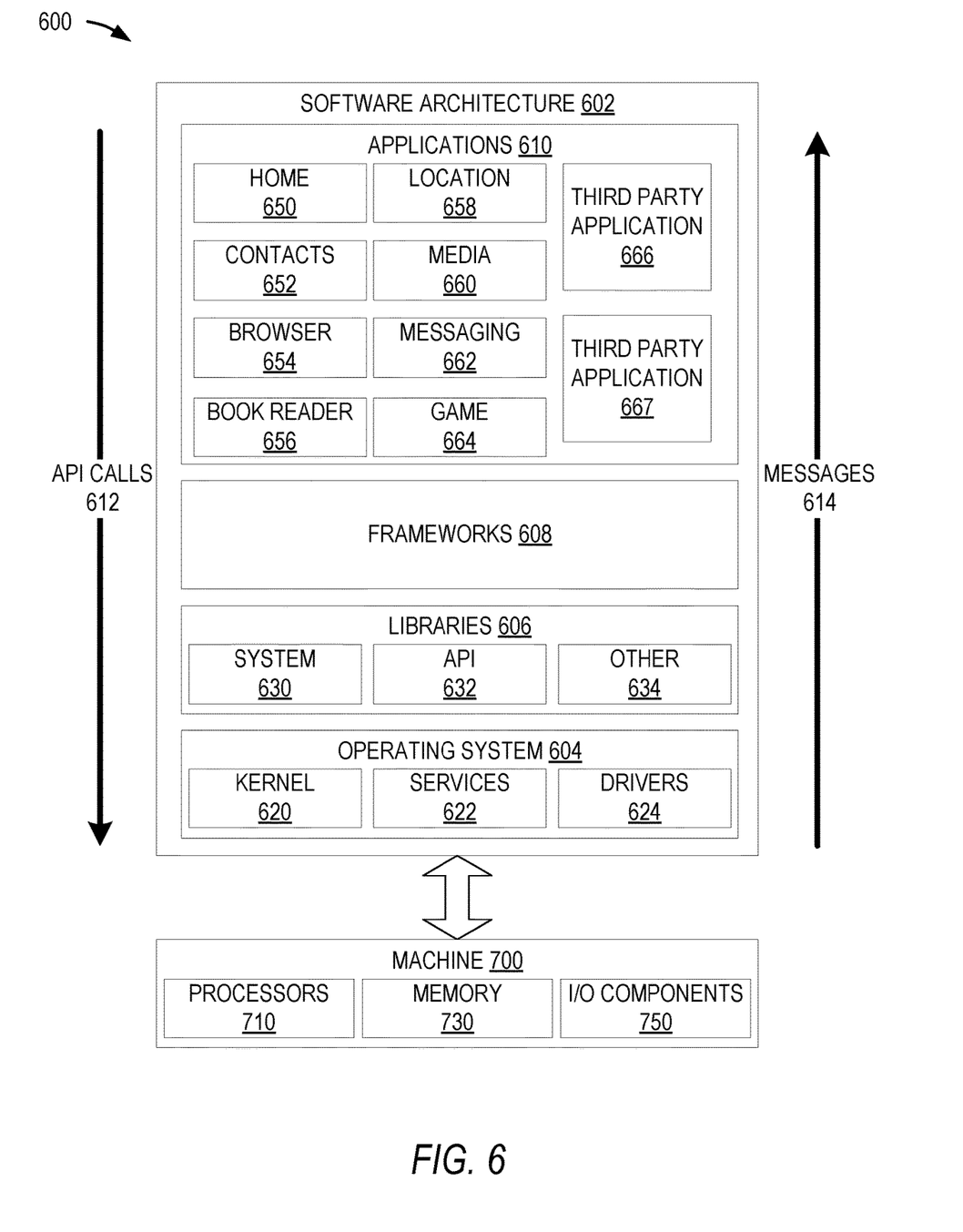
FIG. 6 is a block diagram illustrating an example of a software architecture that may be installed on a machine, according to some example embodiments.

FIG. 6 is a block diagram 600 illustrating software architecture 602, which can be installed on any one or more of the devices described above. For example, in various embodiments, client devices 110 and servers and systems 130, 102, 120, 122, and 124 may be implemented using some or all of the elements of software architecture 602. FIG. 6 is merely a non-limiting example of a software architecture, and it will be appreciated that many other architectures can be implemented to facilitate the functionality described herein. In various embodiments, the software architecture 602 is implemented by hardware such as machine 700 of FIG. 7 that includes processors 710, memory 730, and I/O components 750. In this example, the software architecture 602 can be conceptualized as a stack of layers where each layer may provide a particular functionality. For example, the software architecture 602 includes layers such as an operating system 604, libraries 606, frameworks 608, and applications 610. Operationally, the applications 610 invoke application programming interface (API) calls 612 through the software stack and receive messages 614 in response to the API calls 612, consistent with some embodiments.

In various implementations, the operating system 604 manages hardware resources and provides common services. The operating system 604 includes, for example, a kernel 620, services 622, and drivers 624. The kernel 620 acts as an abstraction layer between the hardware and the other software layers, consistent with some embodiments. For example, the kernel 620 provides memory management, processor management (e.g., scheduling), component management, networking, and security settings, among other functionality. The services 622 can provide other common services for the other software layers. The drivers 624 are responsible for controlling or interfacing with the underlying hardware, according to some embodiments. For instance, the drivers 624 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 606 provide a low-level common infrastructure utilized by the applications 610. The libraries 606 can include system libraries 630 (e.g., C standard library) that can provide functions such as memory allocation functions, string manipulation functions, mathematic functions, and the like. In addition, the libraries 606 can include API libraries 632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and in three dimensions (3D) graphic content on a display), database libraries (e.g., SQLite to provide various relational database functions), web libraries (e.g., WebKit to provide web browsing functionality), and the like. The libraries 606 can also include a wide variety of other libraries 634 to provide many other APIs to the applications 610.

The frameworks 608 provide a high-level common infrastructure that can be utilized by the applications 610, according to some embodiments. For example, the frameworks 608 provide various graphic user interface (GUI) functions, high-level resource management, high-level location services, and so forth. The frameworks 608 can provide a broad spectrum of other APIs that can be utilized by the applications 610, some of which may be specific to a particular operating system 604 or platform.

In an example embodiment, the applications 610 include a home application 650, a contacts application 652, a browser application 654, a book reader application 656, a location application 658, a media application 660, a messaging application 662, a game application 664, and a broad assortment of other applications such as third-party applications 666 and 667. According to some embodiments, the applications 610 are programs that execute functions defined in the programs. Various programming languages can be employed to create one or more of the applications 610, structured in a variety of manners, such as object-oriented programming languages (e.g., Objective-C, Java, or C++) or procedural programming languages (e.g., C or assembly language). In a specific example, the third-party application 666 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 666 can invoke the API calls 612 provided by the operating system 604 to facilitate functionality described herein.

Figure 7:
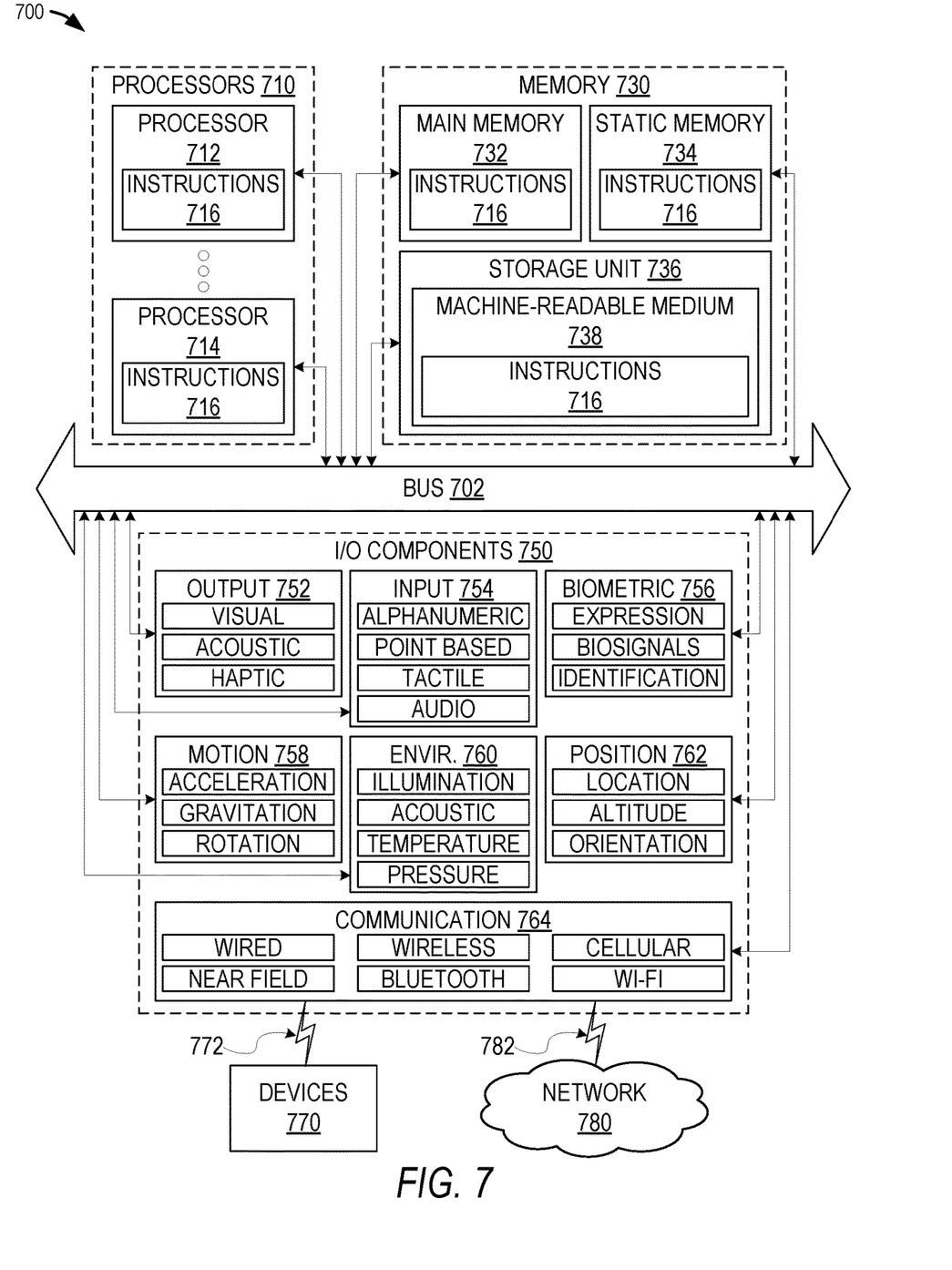
FIG. 7 illustrates a diagrammatic representation of a machine, in the form of a computer system, within which a set of instructions may be executed for causing the machine to perform any one or more of the methodologies discussed herein, according to an example embodiment.

FIG. 7 is a block diagram illustrating components of a machine 700, according to some embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 716 (e.g., software, a program, an application 610, an applet, an app, or other executable code) for causing the machine 700 to perform any one or more of the methodologies discussed herein can be executed. In alternative embodiments, the machine 700 operates as a standalone device or can be coupled (e.g., networked) to other machines. In a networked deployment, the machine 700 may operate in the capacity of a server machine or system 130, 102, 120, 122, 124, etc., or a client device 110 in a server-client network environment, or as a peer machine in a peer-to-peer (or distributed) network environment. The machine 700 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

In various embodiments, the machine 700 comprises processors 710, memory 730, and I/O components 750, which can be configured to communicate with each other via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 712 and a processor 714 that may execute the instructions 716. The term "processor" is intended to include multi-core processors 710 that may comprise two or more independent processors 712, 714 (also referred to as "cores") that can execute instructions 716 contemporaneously. Although FIG. 7 shows multiple processors 710, the machine 700 may include a single processor 710 with a single core, a single processor 710 with multiple cores (e.g., a multi-core processor 710), multiple processors 712, 714 with a single core, multiple processors 712, 714 with multiples cores, or any combination thereof.

The memory 730 comprises a main memory 732, a static memory 734, and a storage unit 736 accessible to the processors 710 via the bus 702, according to some embodiments. The storage unit 736 can include a machine-readable medium 738 on which are stored the instructions 716 embodying any one or more of the methodologies or functions described herein. The instructions 716 can also reside, completely or at least partially, within the main memory 732, within the static memory 734, within at least one of the processors 710 (e.g., within the processor's cache memory), or any suitable combination thereof, during execution thereof by the machine 700. Accordingly, in various embodiments, the main memory 732, the static memory 734, and the processors 710 are considered machine-readable media 738.

As used herein, the term "memory" refers to a machine-readable medium 738 able to store data temporarily or permanently and may be taken to include, but not be limited to, random-access memory (RAM), read-only memory (ROM), buffer memory, flash memory, and cache memory. While the machine-readable medium 738 is shown, in an example embodiment, to be a single medium, the term "machine-readable medium" should be taken to include a single medium or multiple media (e.g., a centralized or distributed database, or associated caches and servers) able to store the instructions 716. The term "machine-readable medium" shall also be taken to include any medium, or combination of multiple media, that is capable of storing instructions (e.g., instructions 716) for execution by a machine (e.g., machine 700), such that the instructions 716, when executed by one or more processors of the machine 700 (e.g., processors 710), cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 750 include a wide variety of components to receive input, provide output, produce output, transmit information, exchange information, capture measurements, and so on. In general, it will be appreciated that the I/O components 750 can include many other components that are not shown in FIG. 7. The I/O components 750 are grouped according to functionality merely for simplifying the following discussion, and the grouping is in no way limiting. In various example embodiments, the I/O components 750 include output components 752 and input components 754. The output components 752 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 754 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 750 include biometric components 756, motion components 758, environmental components 760, or position components 762, among a wide array of other components. For example, the biometric components 756 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 758 include acceleration sensor components (e.g., accelerometer), gravitation sensor components, rotation sensor components (e.g., gyroscope), and so forth. The environmental components 760 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 762 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 750 may include communication components 764 operable to couple the machine 700 to a network 780 or devices 770 via a coupling 782 and a coupling 772, respectively. For example, the communication components 764 include a network interface component or another suitable device to interface with the network 780. In further examples, communication components 764 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 770 may be another machine 700 or any of a wide variety of peripheral devices (e.g., a peripheral device coupled via a Universal Serial Bus (USB)).

Moreover, in some embodiments, the communication components 764 detect identifiers or include components operable to detect identifiers. For example, the communication components 764 include radio frequency identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 764, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 780 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 716 are transmitted or received over the network 780 using a transmission medium via a network interface device (e.g., a network interface component included in the communication components 764) and utilizing any one of a number of well-known transfer protocols (e.g., Hypertext Transfer Protocol (HTTP)). Similarly, in other example embodiments, the instructions 716 are transmitted or received using a transmission medium via the coupling 772 (e.g., a peer-to-peer coupling) to the devices 770. The term "transmission medium" shall be taken to include any intangible medium that is capable of storing, encoding, or carrying the instructions 716 for execution by the machine 700, and includes digital or analog communications signals or other intangible media to facilitate communication of such software.

Furthermore, the machine-readable medium 738 is non-transitory (in other words, not having any transitory signals) in that it does not embody a propagating signal. However, labeling the machine-readable medium 738 "non-transitory" should not be construed to mean that the medium is incapable of movement; the machine-readable medium 738 should be considered as being transportable from one physical location to another. Additionally, since the machine-readable medium 738 is tangible, the machine-readable medium 738 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
analyzing a commit comprising an updated version of software code against a previous version of the software code to determine a plurality of methods in the commit that have been changed;
identifying a previous method version and an updated method version for each method of the plurality of methods that have been changed;
generating a first abstract syntax tree (AST), a first data flow graph (DFG) and a first control flow graph (CFG) of each of the previous method versions;
generating a second AST, a second DFG and a second CFG of each of the updated method versions;
extracting a first AST path context from each of the first ASTs and extracting a second AST path context from each of the second ASTs;
extracting a first DFG path context from each of the first DFGs and extracting a second DFG path context from each of the second DFGs;
extracting a first CFG path context from each of the first CFGs and extracting a second CFG path context from each of the second CFGs;
determining particular AST path contexts that are different by comparing each of the first AST path contexts with a first associated updated method version of each method of the plurality of methods;
determining particular DFG path contexts that are different by comparing each of the first DFG path contexts with a second associated updated method version of each method of the plurality of methods;
determining particular CFG path contexts that are different by comparing each of the first CFG path contexts with a third associated updated method version of each method of the plurality of methods;

encoding each of the particular AST path contexts, the particular DFG path contexts, and the particular CFG path contexts to generate at least one commit vector representation of the commit;

analyzing the at least one commit vector representation by a machine learning model, the machine learning model trained to classify the commit; and outputting, by the machine learning model, a classification of the commit.

2. The computer-implemented method of claim 1, wherein the classification of the commit output by the machine learning model indicates whether the commit contains security-sensitive changes.

3. The computer-implemented method of claim 1, wherein the analyzing of the commit comprising the updated version of the software code against the previous version of the software code comprises:

parsing the commit and the previous version of the software code to determine the plurality of methods.

4. The computer-implemented method of claim 1, wherein the generating of the at least one commit vector representation of the commit comprises using an encoder to generate a numerical representation of each of the particular AST path contexts, the particular DFG path contexts, and the particular CFG path contexts that are different in a single commit vector representation of the commit.

5. The computer-implemented method of claim 1, wherein the generating of the at least one commit vector representation of the commit comprises using an encoder to generate a numerical representation of each of the particular AST path contexts, the particular DFG path contexts, and the particular CFG path contexts in a commit vector representation for each of the particular AST path contexts, the particular DFG path contexts and the particular CFG path contexts.

6. The computer-implemented method of claim 1, wherein the particular AST path contexts are grouped together in a first set, the particular DFG path contexts are grouped together in a second set, and the particular CFG path contexts are grouped together in a third set.

7. The computer-implemented method of claim 1, wherein the particular AST path contexts, the particular DFG path contexts, and the particular CFG path contexts are grouped together in one set of path contexts.

8. The computer-implemented method of claim 1, wherein a symmetric difference is determined to determine the particular AST path contexts, the particular DFG path contexts, and the particular CFG path contexts.

9. The computer-implemented method of claim 1, wherein the at least one commit vector representation of the commit is a concatenation of a vector representation of each of the particular AST path contexts, the particular DFG path contexts, and the particular CFG path contexts.

10. A system comprising:

a memory that stores instructions; and one or more processors configured by the instructions to perform operations comprising:

analyzing a commit comprising an updated version of software code against a previous version of the software code to determine a plurality of methods in the commit that have been changed;

identifying a previous method version and an updated method version for each method of the plurality of methods that have been changed;

generating a first abstract syntax tree (AST), a first data flow graph (DFG) and a first control flow graph (CFG) of each of the previous method versions;

generating a second AST, a second DFG and a second CFG of each of the updated method versions;

extracting a first AST path context from each of the first ASTs, and extracting a second AST path context from each of the second ASTs;

extracting a first DFG path context from each of the first DFGs and extracting a second DFG path context from each of the second DFGs;

extracting a first CFG path context from each of the first CFGs and extracting a second CFG path context from each of the second CFGs;

determining particular AST path contexts that are different by comparing each of the first AST path contexts with a first associated updated method version of each method of the plurality of methods;

determining particular DFG path contexts that are different by comparing each of the first DFG path contexts with a second associated updated method version of each method of the plurality of methods;

determining particular CFG path contexts that are different by comparing each of the first CFG path contexts with a third associated updated method version of each method of the plurality of methods;

encoding each of the particular AST path contexts, the particular DFG path contexts, and the particular CFG path contexts to generate at least one commit vector representation of the commit;

analyzing the at least one commit vector representation by a machine learning model, the machine learning model trained to classify the commit; and outputting, by the machine learning model, a classification of the commit.

11. The system of claim 10, wherein the classification of the commit output by the machine learning model indicates whether the commit contains security-sensitive changes.

12. The system of claim 10, wherein the analyzing of the commit comprising the updated version of the software code against the previous version of the software code comprises:

parsing the commit and the previous version of the software code to determine the plurality of methods.

13. The system of claim 10, wherein the generating of the at least one commit vector representation of the commit comprises using an encoder to generate a numerical representation of one or more differences in a single commit vector representation of the commit.

14. The system of claim 10, wherein the generating of the at least one commit vector representation of the commit comprises using an encoder to generate a numerical representation of one or more differences in a plurality of commit vector representations.

15. The system of claim 10, wherein the particular AST path contexts are grouped together in a first set, the particular DFG path contexts are grouped together in a second set, and the particular CFG path contexts are grouped together in a third set.

16. The system of claim 10, wherein the particular AST path contexts, the particular DFG path contexts, and the particular CFG path contexts are grouped together in one set of path contexts.

17. The system of claim 10, wherein a symmetric difference is determined to determine the particular AST path contexts, the particular DFG path contexts, and the particular CFG path contexts.

18. The system of claim 10, wherein the at least one commit vector representation of the commit is a concatenation of a vector representation of each of the particular AST path contexts, the particular DFG path contexts, and the particular CFG path contexts.

19. A non-transitory computer-readable medium comprising instructions stored thereon that are executable by at least one processor to cause a computing device to perform operations comprising:
  analyzing a commit comprising an updated version of software code against a previous version of the software code to determine a plurality of methods in the commit that have been changed;
  identifying a previous method version and an updated method version for each method of the plurality of methods that have been changed;
  generating a first abstract syntax tree (AST), a first data flow graph (DFG) and a first control flow graph (CFG) of each of the previous method versions;
  generating a second AST, a second DFG and a second CFG of each of the updated method versions;
  extracting a first AST path context from each of the first ASTs, and extracting a second AST path context from each of the second ASTs;
  extracting a first DFG path context from each of the first DFGs and extracting a second DFG path context from each of the second DFGs;
  extracting a first CFG path context from each of the first CFGs and extracting a second CFG path context from each of the second CFGs;
  determining particular AST path contexts that are different by comparing each of the first AST path contexts with a first associated updated method version of each method of the plurality of methods;
  determining particular DFG path contexts that are different by comparing each of the first DFG path contexts with a second associated updated method version of each method of the plurality of methods;
  determining particular CFG path contexts that are different by comparing each of the first CFG path contexts with a third associated updated method version of each method of the plurality of methods;
  encoding each of the particular AST path contexts, the particular DFG path contexts, and the particular CFG path contexts to generate at least one commit vector representation of the commit;
  analyzing the at least one commit vector representation by a machine learning model, the machine learning model trained to classify the commit; and
  outputting, by the machine learning model, a classification of the commit.

20. The non-transitory computer-readable medium of claim 19, wherein the classification of the commit output by the machine learning model indicates whether the commit contains security-sensitive changes.

* * * * *